(12) United States Patent
Janssen et al.

(10) Patent No.: US 9,007,715 B1
(45) Date of Patent: Apr. 14, 2015

(54) SYSTEM FOR REDUCING CONTACT BETWEEN TAPE AND FLANGES OF REEL IN TAPE DRIVE

(71) Applicant: Oracle International Corporation, Redwood City, CA (US)

(72) Inventors: Clark Janssen, Loveland, CO (US); William Vanderheyden, Loveland, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/337,304

(22) Filed: Jul. 22, 2014

(51) Int. Cl.
*G11B 23/07* (2006.01)

(52) U.S. Cl.
CPC .................................... *G11B 23/07* (2013.01)

(58) Field of Classification Search
USPC .............................................. 360/85
See application file for complete search history.

(56) References Cited

U.S. PATENT DOCUMENTS

| | | | |
|---|---|---|---|
| 7,077,354 B2 * | 7/2006 | Saliba | 242/348 |
| 7,243,877 B1 * | 7/2007 | Anderson | 242/614 |
| 7,802,751 B2 * | 9/2010 | Shiga | 242/613.4 |
| 2003/0099064 A1 * | 5/2003 | Ashikawa et al. | 360/132 |
| 2006/0202076 A1 * | 9/2006 | Miura et al. | 242/345 |

* cited by examiner

*Primary Examiner* — Mark Blouin
(74) *Attorney, Agent, or Firm* — Marsh Fischmann & Breyfogle LLP; Jonathon A. Szumny (57) ABSTRACT

A system for limiting contact between a tape (e.g., magnetic, optical) and opposite reel flanges of a reel assembly as the tape is being wound onto or unwound from the reel assembly to reduce axial and radial tape run out and improve tape drive operations.

16 Claims, 8 Drawing Sheets

SYSTEM FOR REDUCING CONTACT BETWEEN TAPE AND FLANGES OF REEL IN TAPE DRIVE

BACKGROUND

1. Field of the Invention

The present invention generally relates to tape drives and, more particularly, to the winding of tape around reels within a tape drive.

2. Relevant Background

Tape drives have been widely employed in industry for over thirty years due to their ability to store large amounts of data on a relatively small and inexpensive removable format. Typically, tape drives use a storage tape that is wound between a pair of tape reels as data is transferred to or from the tape media via a read/write tape head assembly. In one arrangement, one of the reels (e.g., the "take-up" reel) is part of the tape drive while the other reel (e.g., the "cartridge" or "supply" reel) is part of a removable cartridge. Upon insertion of the cartridge into the tape drive, the storage tape on the cartridge reel must be coupled to the take-up reel of the tape drive (e.g., via respective leaders). After coupling, the tape is unwound from the cartridge reel, moved past the tape head assembly and wound onto the take-up reel via a drive motor. Next, the tape is unwound from the take-up reel, moved past the tape head assembly and wound onto the cartridge. Subsequently, the storage tape must be uncoupled from the take-up reel, prior to removing the cartridge from the tape drive. In another arrangement, both reels are part of a cassette which is inserted into a tape drive and driven by a drive motor.

To increase the storage density and reduce the access time of magnetic tapes, a popular trend is towards multi-head, multi-channel fixed head structures with narrowed recording gaps and data track widths so that many linear data tracks may be manipulated on a tape medium of a predetermined width (e.g., such as one-half inch width tape) passing by the head structures at increasingly faster rates of speed. However, various factors work against the ability of present systems to achieve such increased storage densities and reduced access times. As an example, "axial" run out or lateral motion of the tape as the tape moves past the tape head assembly can generate lateral registration differences or errors between the tape head assembly and the data tracks contained on the tape, thus inhibiting such increased storage densities and reduced data access times. As another example, "radial" run out refers to tension variations in the tape that negatively affect tape drive operations.

SUMMARY

One concern that can create both axial and radial tape run out during tape drive operations (e.g., during reading and/or writing operations on a tape moving along a tape path within the tape drive) is contact between first and second opposite lateral edges of the tape and first and second opposite flanges of a reel assembly (e.g., supply reel and/or take-up reel) as the tape is being wound onto and/or off of the reel. Stated differently, the first and second opposite flanges of the reel can sometimes resist or at least affect smooth motion of the tape as it is being wound onto or off of a reel and thereby lead to reduced tape drive performance. Previous approaches to limiting such tape and reel flange contact have focused on controlling the amount of clearance or the width between the reel flanges by reducing media guiding-related tolerances (e.g., such as reel flange clearance tolerances, guide height tolerances, guide tilt tolerances, reel motor runout tolerances, and/or the like). However, doing so can lead to more complex tape drives, increased tape drive costs, increased production times, and the like.

In view of the foregoing, disclosed herein are utilities (e.g., devices, apparatuses, systems, etc.) for limiting or reducing contact between tape and opposite flanges of a reel during tape packing and unloading sequences in a tape drive in a manner that is substantially free of many of the inefficiencies associated with existing approaches to reducing such contact. Stated differently, the present utilities limit or reduce tape and reel flange contact as tape is wound onto or off of a reel to correspondingly limit or reduce axial and radial tape run out and thereby increase lateral registration accuracy between a tape head assembly and data tracks on the tape free of substantial increases in cost and production time of a tape drive.

Broadly, the disclosed utilities include a device positioned relative to a reel assembly of a tape drive that reduces an axial distance between first and second opposite lateral edges of a tape to be less than a clearance (e.g., width) between first and second opposite lateral flanges of a reel assembly and thereby limit contact between the first and second opposite lateral edges of the tape and first and the second opposite lateral flanges of the reel assembly. For instance, the tape may pass by or through the device in conjunction with (e.g., just before) the tape is being fed between the first and second opposite flanges of the reel assembly. The device may be positioned so that the axial distance between the first and second lateral edges of the tape returns to the original width of the tape as the tape makes contact with the tape pack wrapped around the hub of the reel assembly. As another example, passing the tape by or through the device as the tape is being unwound from the reel assembly also reduces the axial distance between the first and second lateral edges of the tape while the tape is between the first and second opposite flanges thereby limiting contact between the first and second lateral edges of the tape and the first and second opposite flanges of the reel assembly. As a result of the decreased tape/reel flange contact in the manners disclosed herein, reduced axial and radial tape run out and the associated tape drive performance inefficiencies that may otherwise occur from tape/reel flange contact may occur. Furthermore, media guiding tolerances may become less critical and the reel flange clearance (e.g., width between the first and second opposite flanges) may advantageously substantially approach the width of tape, thus producing increased uniformity of media packing for storage and later retrieval.

In one aspect, a system for a tape storage device includes a reel including a hub for receiving tape thereon, a first flange member secured adjacent a first side of the hub, and a second flange member secured adjacent a second side of the hub, wherein the second side is opposite the first side; and a device positioned relative to the hub for reducing an axial distance between first and second lateral edges of a width of the tape before the tape is received on the hub to limit contact between the tape and the first and second flange members.

In another aspect, a tape drive includes a housing, a reel secured within the housing, and a device positioned relative to the reel for reducing an axial distance between first and second lateral edges of tape before the tape is received on the reel.

In a further aspect, a method for reducing contact between tape and first and second spaced flanges of a reel in a tape drive includes moving the tape along a tape path within the tape drive, where an axial distance between first and second lateral edges of the tape is a first axial distance during the moving step; and receiving the tape between the first and second spaced flanges of the reel, where the axial distance between first and second lateral edges of the tape is a second axial distance during at least a portion of the receiving step, and where the second axial distance is less than the first axial distance.

DETAILED DESCRIPTION

Disclosed herein are utilities that limit contact between opposite flanges of a reel and a tape being wound onto or off of the reel in a tape drive for improving lateral registration between a tape head assembly and data tracks on the tape, facilitating more uniform tape packing on the hub of the reel, increasing packing density, and the like. For instance, a reducing device disclosed herein may be positioned relative to a reel in a tape drive in any appropriate manner (e.g., attached thereto, spaced therefrom, etc.) to reduce or limit contact between the tape and the reel flanges as the tape is wound onto or off of the reel hub. In this regard, many types of errors or inefficiencies (e.g., in relation to loading, friction, tension, misalignment, reading, writing, and the like) may be reduced leading to a more consistent head to tape interface, greater tape tracking performance, increased packing density, and the like.

Figure 1:
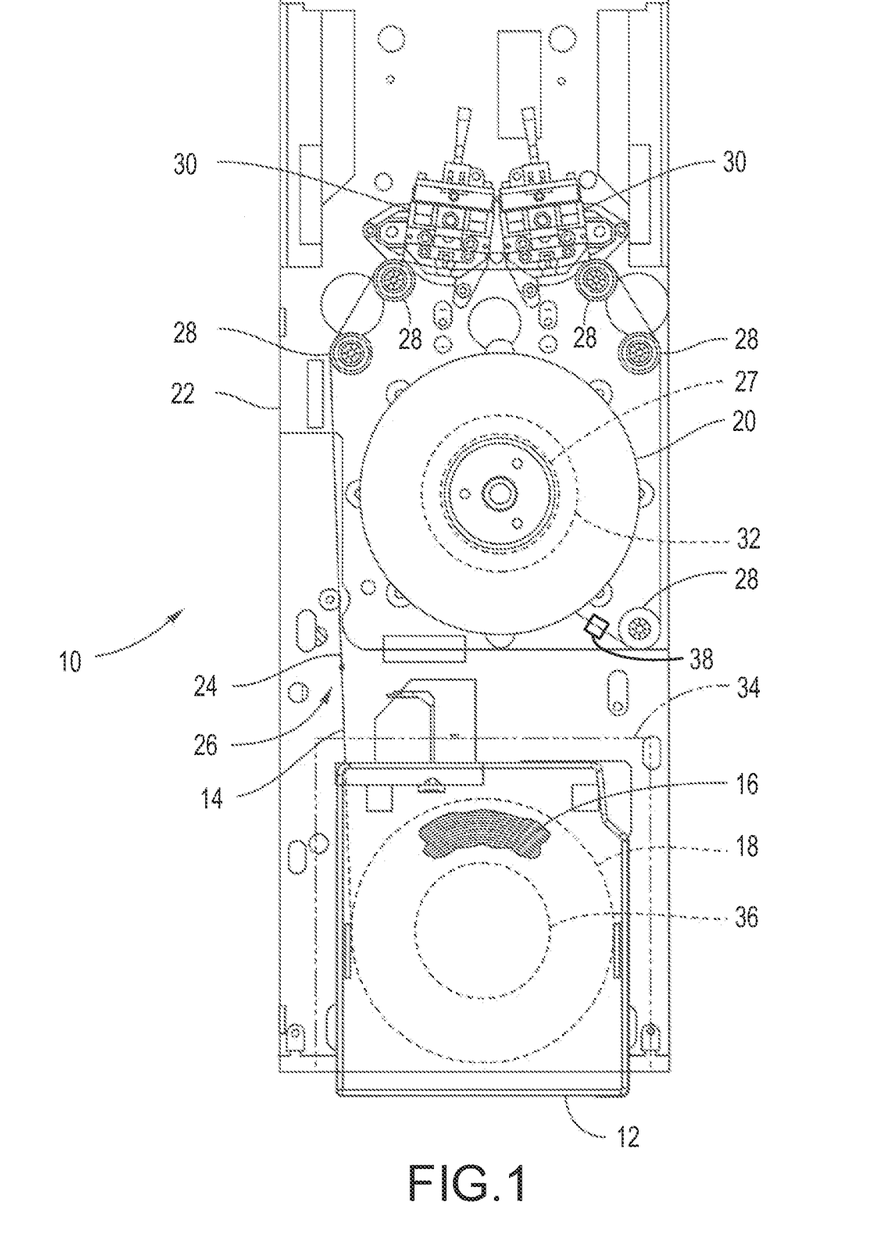
FIG. 1 is a plan view of a tape drive according to one embodiment.

Before discussing particulars of the disclosed utilities in more detail, reference will initially be made to FIG. 1 which illustrates one type of tape drive 10 in which the disclosed utilities may be implemented. Discussion of the tape drive 10 of FIG. 1 is merely provided to assist the reader in understanding one specific context in which the disclosed utilities may be used. In this regard, it should be understood that the disclosed utilities may be utilized in numerous other contexts (e.g., different types of tape drives, cartridges, cassettes, and the like) where reduction of contact between the reel flanges and the tape may be desired.

Broadly, the tape drive 10 is operable to write data to and/or read data from a supply reel 18 of tape 16 (e.g., magnetic tape) of a tape cartridge 12. The tape drive 10 may have a take-up reel 20 that is rotatably supported on a drive body or housing 22. One or more reducing devices represented by box 38 in FIG. 1 (discussed in more detail below) may be positioned relative to each of one or more reels of the tape drive 10 (e.g., as shown, relative to the take-up reel 20) to compress or curve the tape 16 between the first and second lateral edges of the tape 16 to limit contact between the first and second lateral edges of the tape 16 and opposite flanges of the reel 20. As will be discussed, this compression or curving of the tape caused by the disclosed reducing device reduces an axial distance between first and second lateral edges of the tape 16 by bringing the first and second lateral edges loser together and thus away from the opposite flanges of the take-up reel 20 before the tape 16 is received on the take-up reel 20.

In any event, a drive leader 24 of the take-up reel 20 may be attachable to a cartridge leader 14 of the tape cartridge 12 so as to pull the cartridge leader 14 and tape 16 along a tape path 26 to the take-up reel 20. The drive leader 24, cartridge leader 14 and tape 16 are configured to wrap around a reel hub 27 of the take-up reel 20 such that the tape 16 and leaders 14 and 24 form a tape pack. The tape drive 10 may further include one or more guide members, such as rollers 28, for guiding movement of the drive leader 24, cartridge leader 14 and tape 16 along the tape path 26. Additionally, the tape drive 10 may also include one or more magnetic heads 30 (e.g., a "head assembly") for performing read and/or write operations on the tape 16, a motor 32 for driving the take-up reel 20 (e.g., having a stator that is non-movably secured to the housing 22, and a rotor that is rotatably positioned relative to the stator and that is rotated upon passing a current through a conductor of the stator), and a cartridge receiver 34 for receiving the tape cartridge 12. Furthermore, the cartridge receiver 34 may include a motor 36 that is configured to drive the supply reel 18 of the tape cartridge 12. Rollers 28, magnetic heads 30, motors 32 and 36, and cartridge receiver 34 may be mounted in and supported by the housing 22.

As discussed previously, contact between the tape 16 and the opposite flanges of the reel 20 as the tape 16 fits between the opposite flanges can negatively affect tape drive operations when loading the tape 16 onto and/or unloading tape from the hub 27 of the reel 20. For instance, wobbling of the reel 20 (e.g., where the take-up reel 20 does not rotate in a desired and constant rotation path) may cause the opposite reel flanges to contact the lateral edges of the tape 16 creating unwanted tape movement (e.g., axial and radial tape run out) which may then affect the functionality of the tape drive 10. Previous attempts to limit contact between the lateral edges of the tape 16 and the opposite flanges of the reel 20 have focused on attempting to control the amount of clearance between media reel flanges by decreasing media guiding related tolerances including guide height tolerances, guide tilts tolerances, and reel motor run out tolerances, and the like. However, doing so can lead to more complex tape drives, increased tape drive costs, increased production times, and the like.

Figure 2:
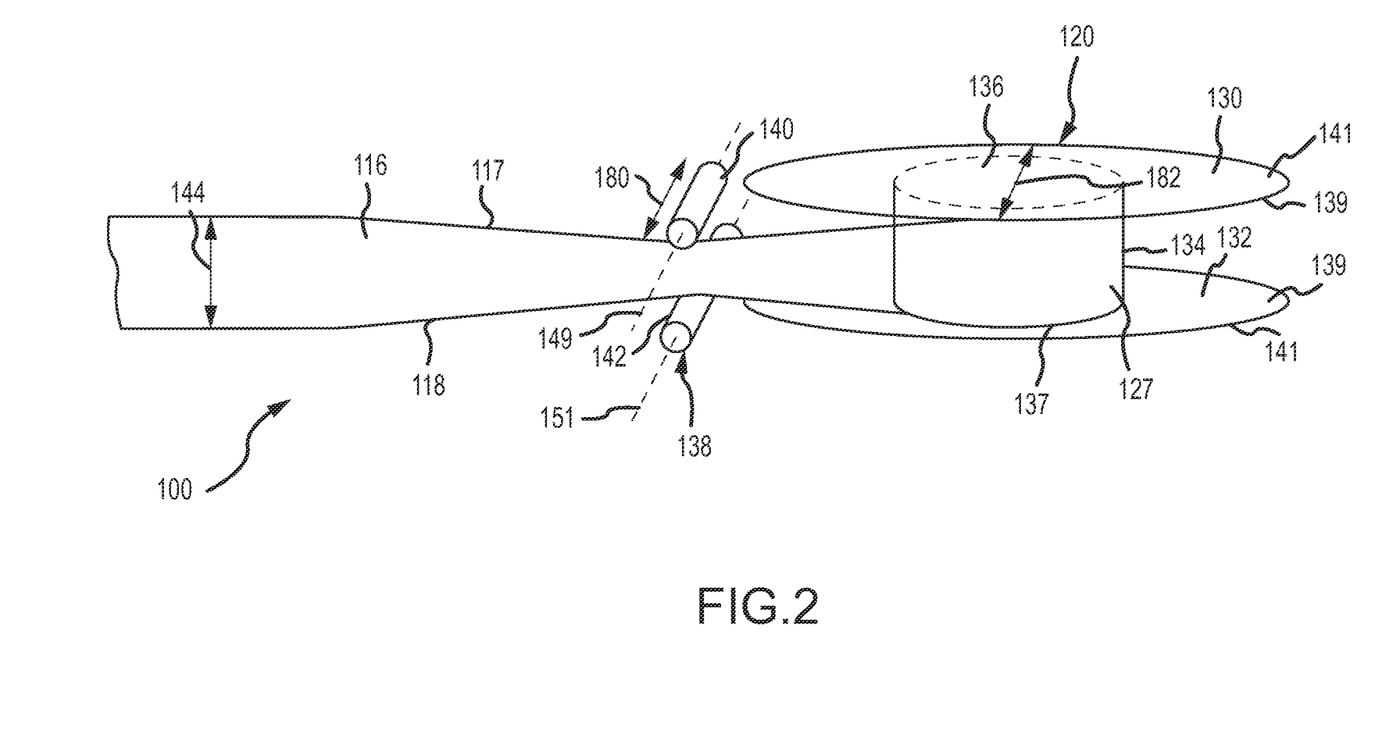
FIG. 2 is a partial perspective view of a system including a device that reduces an axial distance between first and second lateral edges of magnetic tape before the tape is packed onto a reel hub, according to one embodiment.
Figure 3:
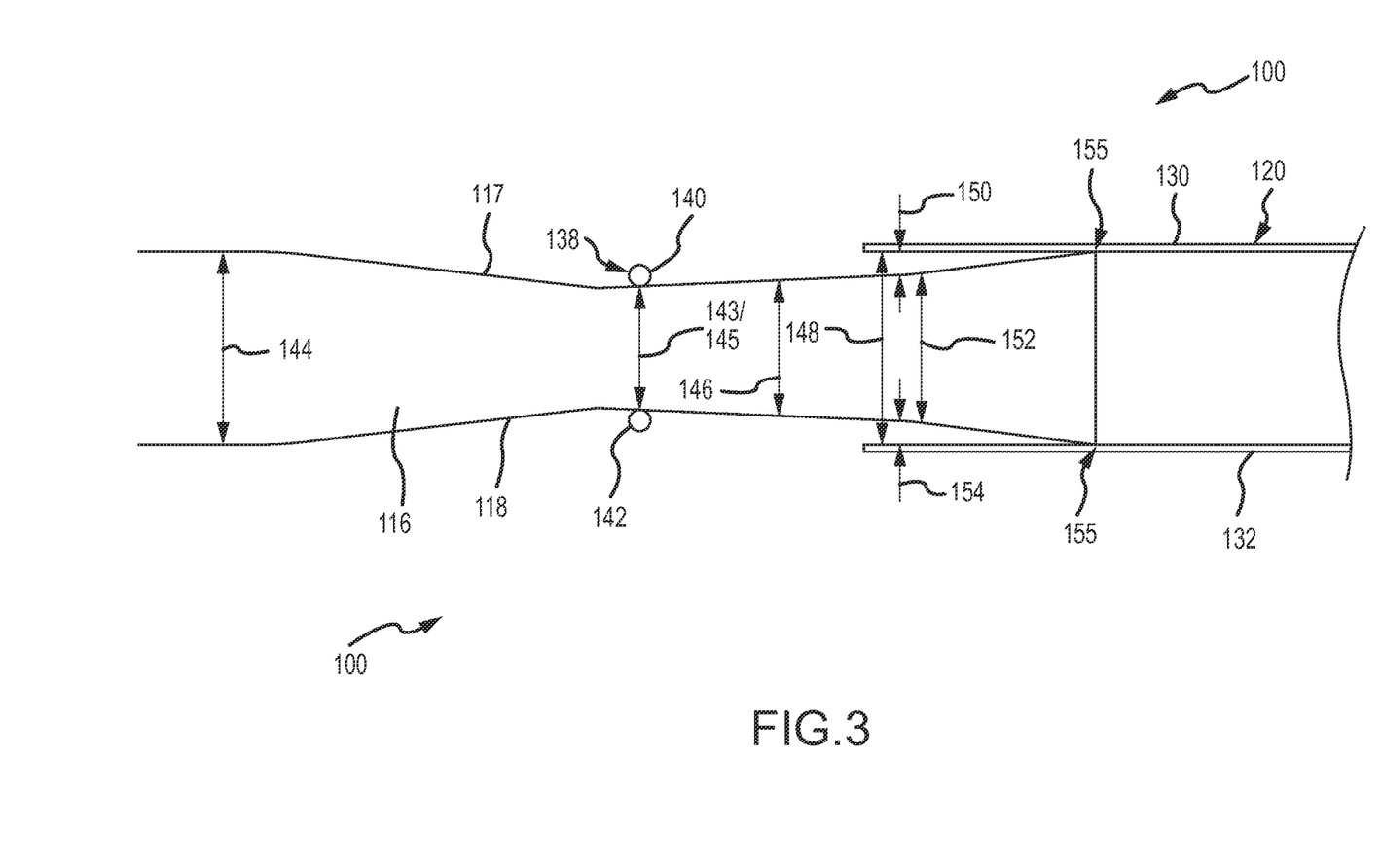
FIG. 3 is a side view of the system of FIG. 2.
Figure 4:
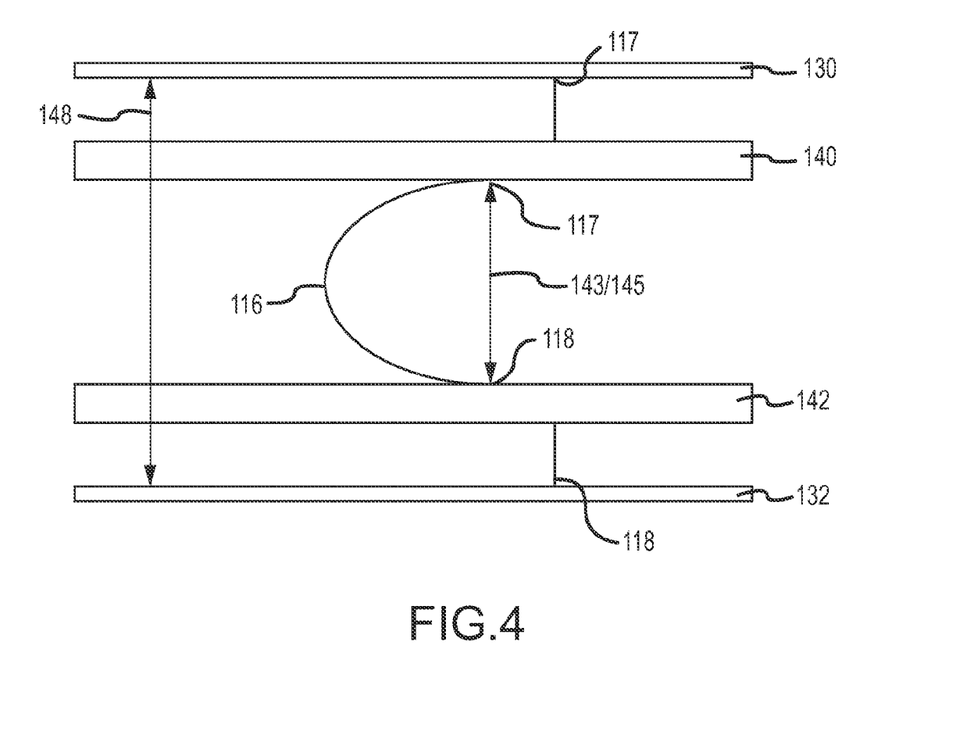
FIG. 4 is an end view of the system of FIG. 3.

With reference now to FIGS. 2-4, a system 100 is illustrated that limits contact between the lateral edges of tape 116 (e.g., tape 16 of FIG. 1) and first and second opposite flanges 130, 132 of a reel assembly 120 (e.g., reel 20 of FIG. 1) onto or from which the tape 116 is being wound or unwound by decreasing the axial distance between first and second lateral edges 117, 118 of the tape 116 as the tape 116 passes between the first and second opposite flanges 130, 132. As used herein, the "axial distance" between the first and second lateral edges 117, 118 of the tape 116 refers to the distance along an axis that interconnects the first and second lateral edges 117, 118 and that is perpendicular to each of the first and second lateral edges 117, 118. As also used herein, the "width" of the tape 116 refers to the distance of a line along the surface of the tape 116 that interconnects the first and second lateral edges 117, 118 and that is perpendicular to each of the first and second lateral edges 117, 118, where the line may or may not coincide with the axial distance between the first and second lateral edges 117, 118.

For instance, in the absence of the disclosed utilities reducing or decreasing the axial distance between the first and second lateral edges 117, 118 (e.g., when the tape 116 is passing in front of a tape head, when the tape 116 is wrapped on the tape back on the reel hub 127, etc.), the axial distance between the first and second lateral edges 117, 118 equals the width of the tape. In contrast, when the utilities disclosed herein have reduced or decreased the axial distance between the first and second lateral edges 117, 118 (e.g., when the tape is passing between the first and second opposite flanges 130, 132), the axial distance between the first and second lateral edges 117, 118 is less than the width of the tape. The system 100 reduces the criticality of narrow media guiding tolerances and allows the reel flange clearance (i.e., the distance or width between the first and second opposite flanges 130, 132) to advantageously approach the width of tape 116, thus producing highly uniform media packing for storage and later retrieval.

Broadly, the system 100 includes at least one reel assembly 120 (e.g., take-up reel 20 in the tape drive 10 of FIG. 1) and a reducing device 138 (e.g., reducing device 38 in FIG. 1) positioned relative to the reel assembly 120 that reduces the axial distance between first and second lateral edges 117, 118 of the tape 116 (to be less than the width of the tape 116) to limit contact between the first and second lateral edges 117, 118 and first and second opposite flanges 130, 132 of the reel assembly 120. The first and second opposite flanges 130, 132 include respective inner and outer surfaces 139, 141 and are appropriately secured to or adjacent respective opposite first and second ends 136, 137 of a reel hub 127 of the reel assembly 120. The reel hub 127 includes an outer circumferential surface or wall 134 about which the tape 116 is configured to be wound or unwound. As a motor (e.g., motor 32 of FIG. 1) moves the tape 116 along a tape path (e.g., tape path 26 of FIG. 1) in a first direction, the tape 116 may be appropriately received between the first and second opposite flanges 130, 132 and wrapped about the reel hub 127 (or about a tape pack already present on the reel hub 127). When the motor moves the tape 116 along the tape path in an opposite second direction, the tape 116 may be unwound from the reel hub 127 (or from the tape pack already present on the reel hub 127). The first and second opposite flanges 130, 132 serve to protect and contain the tape pack on the reel hub 127.

As mentioned above, the device 138 may be positioned relative to the reel assembly 120 in any appropriate manner to decrease the axial distance between the first and second lateral edges 117, 118 of the tape 116 to limit contact between the first and second lateral edges 117, 118 and the first and second opposite flanges 130, 132 of the reel assembly 120. While specific embodiments of the reducing device 138 will be shown and described herein, it is to be understood that many different variations in which to construct and position the reducing device 138 exist and may vary depending on how much the axial distance between the first and second lateral edges 117, 118 of the tape 116 needs to be reduced to avoid contact with the flanges 130, 132 (e.g., at least some degree less than a distance (e.g., clearance) 148 between respective inner surfaces (not labeled) of the flanges 130 and 132), the width of the tape 116, a known or assumed amount of wobble of the reel 120, and/or the like. With a reduced axial distance between the first and second lateral edges 117, 118, the tape 116 may be wound on the reel hub 127 substantially free of contacting, moving (e.g., dragging) against, etc. the flanges 130 and 132 that may otherwise induce axial and/or radial tape run out and associated tape drive operation inefficiencies.

In one embodiment, and as shown in FIGS. 2-4, the reel assembly 120 may be movable relative to the reducing device 138. Stated differently, movement (e.g., rotation) of the reel assembly 120 may not necessarily induce corresponding movement of the reducing device 138. Furthermore, the reducing device 138 may be substantially non-displaceable relative to tape 116 passing thereby so as to exert a force against one or both of the first and second lateral edges 117, 118 of the tape 116 to reduce the axial distance between the first and second lateral edges 117, 118 as will be discussed below.

As an example, the reducing device 138 may include one guide member such as first and second guide members 140, 142 spaced by a distance 143 (e.g., an inner cross-dimension) to create a space or opening therebetween through which the tape 116 passes. Inner surfaces of the first and second guide members 140, 142 (e.g., opposite inner surfaces of the opening) are respectively configured to contact the first and second lateral edges 117, 118 of the tape 116 as the tape 116 travels therepast or therethrough along the tape path to reduce the axial distance between the first and second lateral edges 117, 118 from a first axial distance 144 (e.g., the same as the width of the tape 116) down to a second axial distance 145 that is less than the width of the tape and less than the clearance 148 between the respective inner surfaces of the flanges 130 and 132. For instance, each of the first and second guide members 140, 142 may be in the form of any appropriate member (e.g., rod, other curved surface, etc.) over which the tape 116 is configured to pass. The inner surfaces of the first and second guide members 140, 142 may be spaced from each other by the distance 143 configured to reduce the axial distance between the first and second lateral edges 117, 118 to an amount less than the width of the tape 116 (e.g., to the axial distance 145).

In use, the tape 116 may be configured to travel along the tape path between the first and second guide members 140, 142. As the tape 116 passes between the first and second guide members 140, 142, the first and second guide members 140, 142 respectively contact and exert a force against the first and second lateral edges of the tape 116 to at least partially compress (e.g., curve, pinch, etc.) the tape 116 and reduce the axial distance between the first and second lateral edges 117, 118 from the axial distance 144 (e.g., the width of the tape 116) down to the axial distance 145 (e.g., a distance less than the width of the tape 116). As just one example, the reducing device 138 may be configured to reduce the axial dimension between the first and second lateral edges 117, 118 to not greater than about 70% of the width of the tape 116. While FIG. 4 illustrates the tape 116 being pinched or compressed in one direction, it is to be understood that the reducing device 138 may also be configured to pinch or compress the tape 116 in the opposite direction. Furthermore, the pinching or compression need not necessarily be perfectly symmetrical as shown in FIG. 4.

After passing by or through the reducing device 138, the axial distance between the first and second lateral edges 117, 118 of the tape 116 may remain less than the clearance 148 between the first and second flanges 130, 132 to create respective gaps 150, 154 between the first and second lateral edges 117, 118 and the inner surfaces of the first and second flanges 130, 132. While remaining less than the clearance 148 between the first and second flanges 130, 132, the axial distance between the first and second lateral edges 117, 118 of the tape 116 may gradually increase (e.g., the tape 116 may gradually uncompress) from the reducing device 138 to a point or location 155 at which the tape 116 meets the reel hub 127 or the tape pack on the reel hub 127. See FIG. 3.

For instance, the tape 116 may have a first axial distance 143 between the first and second guide members 140, 142, a second axial distance 146 greater than the first axial distance 143 after passing by the first and second guide members 140, 142, and third axial distance 152 greater than the second axial distance 146 when between the first and second flanges 130, 132, and so on, all of which are less than the clearance 148 between the first and second flanges 130, 132, until the point or location 155 at which the axial distance between the first and second lateral edges 117, 118 may return to the width of the tape 116. It is to be understood that the first and second guide members 140, 142 may be appropriately spaced from each other and from the reel assembly 120 to achieve a desired reduced axial distance between the first and second lateral edges 117, 118 of the tape 116. That is, the details of the reducing device 138 may be varied for the desired amount of reduction in axial distance between the first and second lateral edges 117, 118 of the tape 116 in relation to the clearance 148 between the first and second flanges 130, 132. When the tape 116 is moved in the opposite second direction along the tape path, passing the tape 116 between the first and second guide members 140, 142 as the tape 116 is unwound from the reel assembly 120 causes the first and second guide members 140, 142 to exert respective forces against the first and second lateral edges 117, 118 of the tape 116 to naturally draw or pull the first and second lateral edges 117, 118 away from the inner surfaces of the first and second flanges 130, 132 and thereby create gaps 150, 154.

The first and second guide members 140, 142 may be secured to the housing (e.g., housing 22 of FIG. 1) of the tape drive (e.g., tape drive 10 of FIG. 1) in any appropriate manner (e.g., rigidly, rotatably, etc.) relative to the reel assembly 120 (e.g., reel 20 of FIG. 1) so as to be non-displaceable relative to tape 116 passing thereby. That is, the first and second guide members 140, 142 or other member(s) of the reducing device 138 may be secured to the housing 22 so as to at least partially displace (e.g., compress) the first and second lateral edges 117, 118 of the tape 116 rather than being displaceable by the tape 116 as the tape 116 passes by the reducing device 138. In one arrangement, the first and second guide members 140, 142 may be rigidly (non-movably) attached to the housing in a stationary fashion (e.g., via bolts, welding, etc). In another arrangement, the first and second guide members 140, 142 may be secured to the housing so as to be rotatable (e.g., freely rotatable) about respective axes 149, 151. In this regard, moving contact between the tape 116 and the first and second guide members 140, 142 as the tape 116 is traveling therepast may induce corresponding rotation of the first and second guide members 140, 142 about the respective axes 149, 151 rather than manifest as increased friction between the tape 116 and the first and second guide members 140, 142.

Figure 5:
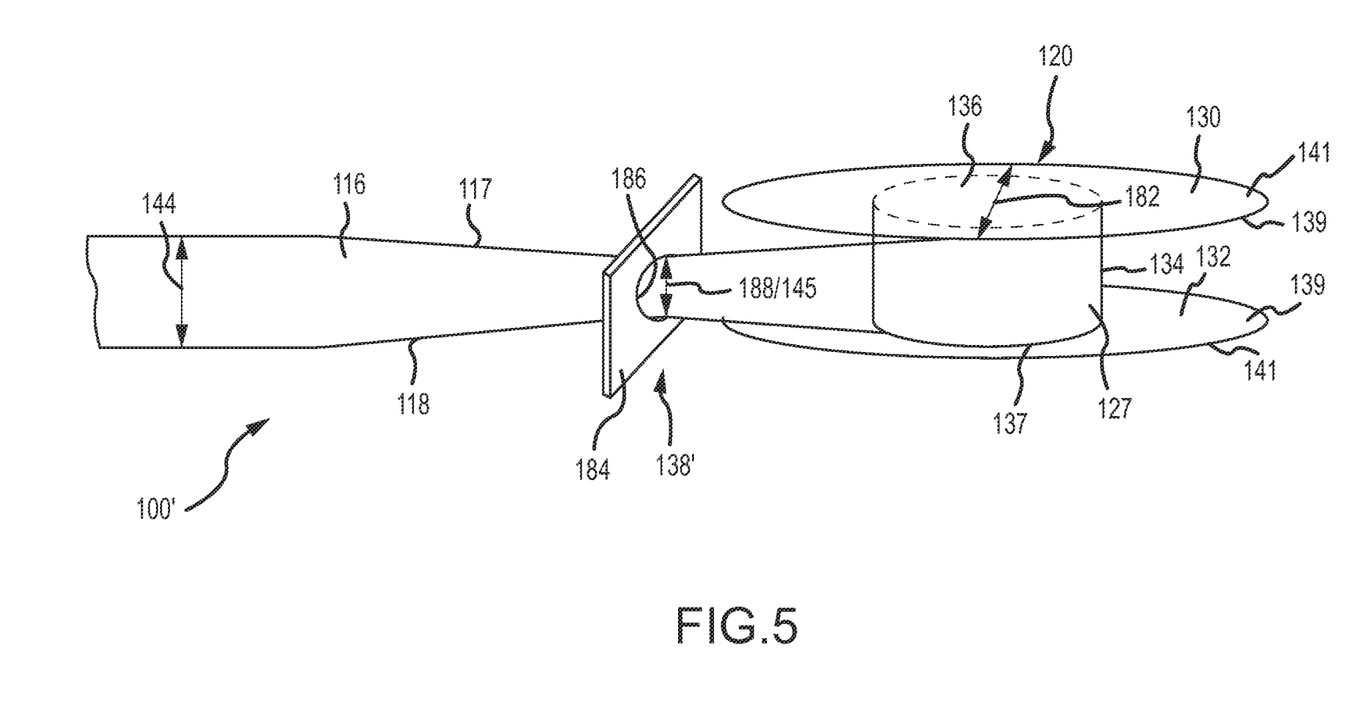
FIG. 5 is a partial perspective view of a system including a device that reduces an axial distance between first and second lateral edges of magnetic tape before the tape is packed onto a reel hub, according to another embodiment.

Turning now to FIG. 5, another embodiment of a system 100' including a reducing device 138' is illustrated that is configured to reduce the axial distance between the first and second lateral edges 117, 118 of the tape 116 to limit contact between the tape and the first and second flanges 130, 132 of the reel assembly 120. The reducing device 138' may be in the form of a member 184 (e.g., plate, block, etc.) constructed of any appropriate material and rigidly (non-movably) secured to the housing (e.g., housing 22 of FIG. 1) of the tape drive in any appropriate manner (e.g., screws, brackets, etc.). As shown, the member 184 may include at least one opening 186 therethrough through which the tape 116 is configured to pass either just before being wound onto the reel assembly 120 or just after being unwound from the reel assembly 120. The opening 186 may have a cross-dimension 188 (e.g., an inner cross-dimension, an inner diameter, etc.) that is less than the width of the tape 116 and less than the clearance 148 between the first and second flanges 130, 132 of the reel assembly 120.

In this regard, inner surfaces (not labeled) of the opening 186 may be configured to exert a force against the first and second lateral edges 117, 118 of the tape as the tape 116 passes therethrough along the tape path to compress the tape 116 and thereby reduce the axial distance between the first and second lateral edges 117, 118 from a first axial distance 144 (the width of the tape 144) down to a second axial distance 145 that is less than the width of the tape and less than the clearance 148. While not labeled in FIG. 5, gaps (e.g., gaps 150, 154) may be created between the first and second lateral edges 117, 118 of the tape and the first and second flanges 130, 132 as the tape is being wound onto or unwound from the reel hub 127. To limit friction between the tape 116 and the member 184, the inner surfaces of the opening 186 may be appropriately curved or smoothed and/or constructed of a material designed to limit such friction. In some embodiments, the member 184 may be constructed of a particular thickness to ensure stability and/or to limit the degree of contact between the lateral edges 117, 118 of the tape 116 and the member 184.

Many variations of the above embodiments and arrangements are envisioned for reducing the axial distance between the first and second lateral edges 117, 118 of the tape 116 so as to limit contact between the tape 116 and the first and second flanges 130, 132 of the reel assembly 120. In a variation of the reducing device 138' of FIG. 6, the member 184 may in the form of a tubular or conical member that may be substantially parallel to the tape path. For instance, an inner diameter of the tubular member may gradually decrease with increasing proximity to the reel assembly 120. In this regard, an axial distance between the first and second lateral edges 117, 118 of tape 116 passing therethrough towards the reel assembly 120 may gradually decrease until the tape 116 exits the tubular member 184. Thereafter, the axial distance between the first and second lateral edges 117, 118 of tape 116 may gradually increase (e.g., the tape 116 may gradually uncompress) until the axial distance between the first and second lateral edges 117, 118 equals the width of the tape 116 as the tape 116 is being wound about the reel hub 127 or the tape pack on the reel hub 127. As the tape is gradually uncompressing, gaps (e.g., gaps 150, 154) may be respectively maintained between the first and second lateral edges 117, 118 of the tape and the first and second flanges 130, 132 of the reel assembly 120.

Variations in placement of the reducing devices 138, 138' can affect the amount of curving or compression of the tape 116 that takes place in the process. As just one example, reducing the distance between the reducing device 138 and the reel assembly 120 while maintaining a constant distance 143 between the first and second guide members 140, 142 of the reducing device 138 can increase the degree of compression of the tape 116 and thus increase the gaps 150, 154 between the first and second lateral edges 117, 118 and the first and second flanges 130, 132. Also, different combinations of placements of the reducing device 138 in relation to the reel assembly 120 and between the first and second guide members 140, 142 can impart similar degrees of tape compression. For instance, increasing the distance between the reducing device 138 and the reel assembly 120 while reducing the distance 143 between the first and second guide members 140, 42 can impart a similar degree of compression as decreasing the distance between the reducing device 138 and the reel assembly 120 while increasing the distance 143 between the first and second guide members 140, 142. In one arrangement, a length 180 of each of the first and second guide members 140, 142 may be substantially equal to a diameter 182 of the first and second flanges 130, 132 so that the first and second guide members 140, 142 can continue to reduce the axial distance between the first and second lateral edges 117, 118 of the tape 116 (i.e., curve/compress the tape 116) even as the diameter of the tape pack about the reel hub 127 increases. The combination of device locations and device characteristics may depend on the desired degree of tape compression for each specific tape drive, therefore creating a multitude of possible variations of these embodiments.

Figure 6:
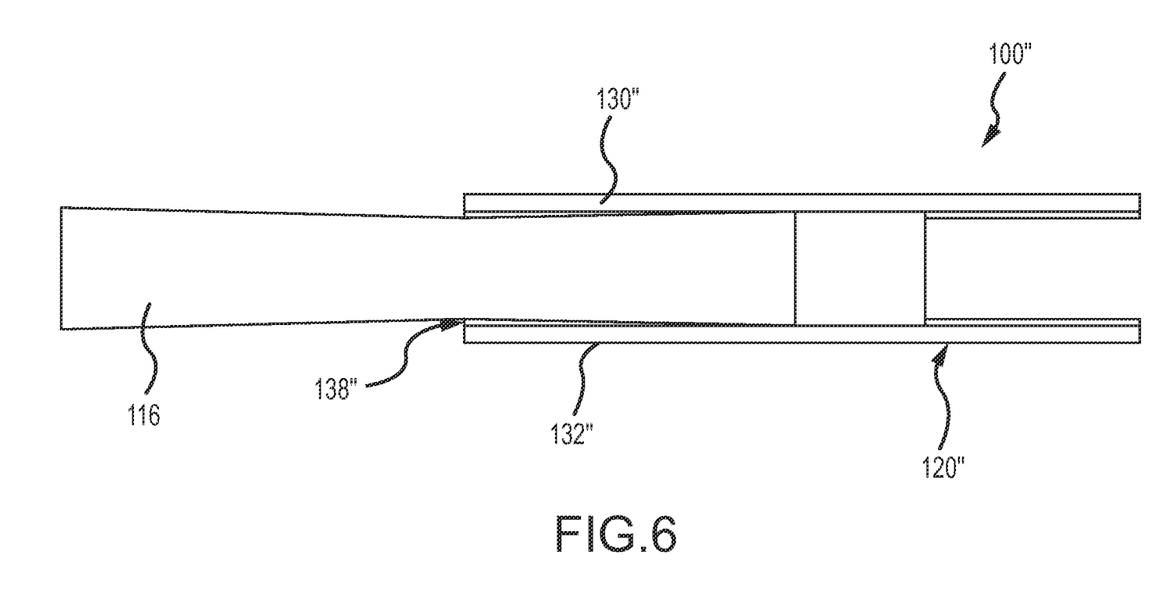
FIG. 6 is a side view of a system including a device that reduces an axial distance between first and second lateral edges of magnetic tape before the tape is packed onto a reel hub, according to another embodiment.
Figure 7:
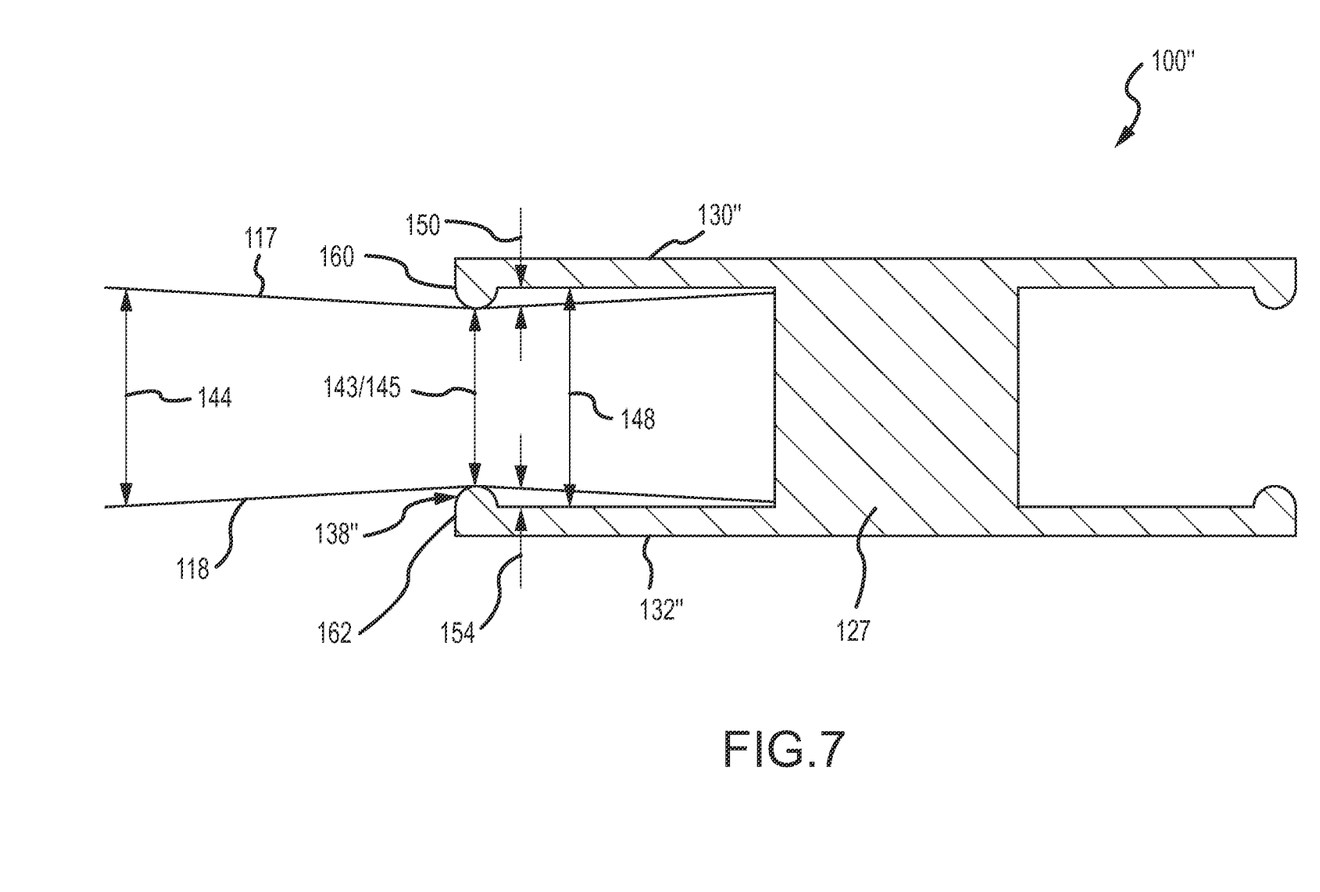
FIG. 7 is a sectional view through the device of FIG. 6.

In another arrangement, the reducing device 138 may be non-movably secured to the reel assembly 120. More specifically, the reducing device 138 may be rigidly secured to at least one of the first and second flanges 130, 132 of the reel assembly 120 so that rotation of the reel assembly 120 induces corresponding rotation of the reducing device 138. Turning now to FIGS. 6-7, another embodiment of the system 100" is illustrated in which the reducing device 138" is rigidly secured to at least one of the first and second flanges 130, 132 of the reel assembly 120, such as adjacent an outer periphery of one of the first and second flanges 130, 132. For instance, the reducing device 138" may include a first portion 160 rigidly secured to an inner surface of the first flange 130" and a second portion 162 rigidly secured to an inner surface of the second flange 132". In one arrangement, each of the first and second portions 160, 162 may be in the form of a protrusion (e.g., rim, rib, bead, etc.) that extends from the inner surface of the respective first or second flange 130", 132" towards the other portion and into the tape path of the tape 116.

Similar to the reducing device 100 of FIGS. 2-4, a distance 143 between inner surfaces of the first and second portions 160, 162 of the reducing device 138" of FIGS. 6-7 may be less than the clearance 148 between the inner surfaces of the first and second flanges 130", 132" so as to contact (e.g., compress) the tape 116 and reduce the axial distance between the first and second lateral edges 117, 118 from a first axial distance 144 (e.g., equal to the width of the tape) down to a second axial distance 145 less than the clearance 148. Again, passing of the tape 116 through or past the reducing device 138" creates respective gaps 150, 154 between the first and second lateral edges 117, 118 of the tape 116 and the first and second flanges 130", 132" of the reel assembly 120" to reduce both axial and radial tape run out and the tape drive inefficiencies associated therewith.

In one embodiment, the first and second portions 160, 162 may be made of the same material as the flanges (i.e., the first and second portions 160, 162 may be one-piece with the first and second flanges 130", 132"), such as to reduce manufacturing costs, time, and/or the like. In another embodiment, the first and second portions 160, 162 may be made of a different material than the first and second flanges 130", 132" and secured or connected to the inner surfaces of the first and second flanges 130", 132" in any appropriate manner. For instance, the first and second portions 160, 162 may be constructed of any appropriate wear-resistant material such as Zirconium nitride and/or the like. As another example, the first and second portions 160, 162 may be constructed of a material that absorbs vibrations from any contact with the tape 116.

Figure 8:
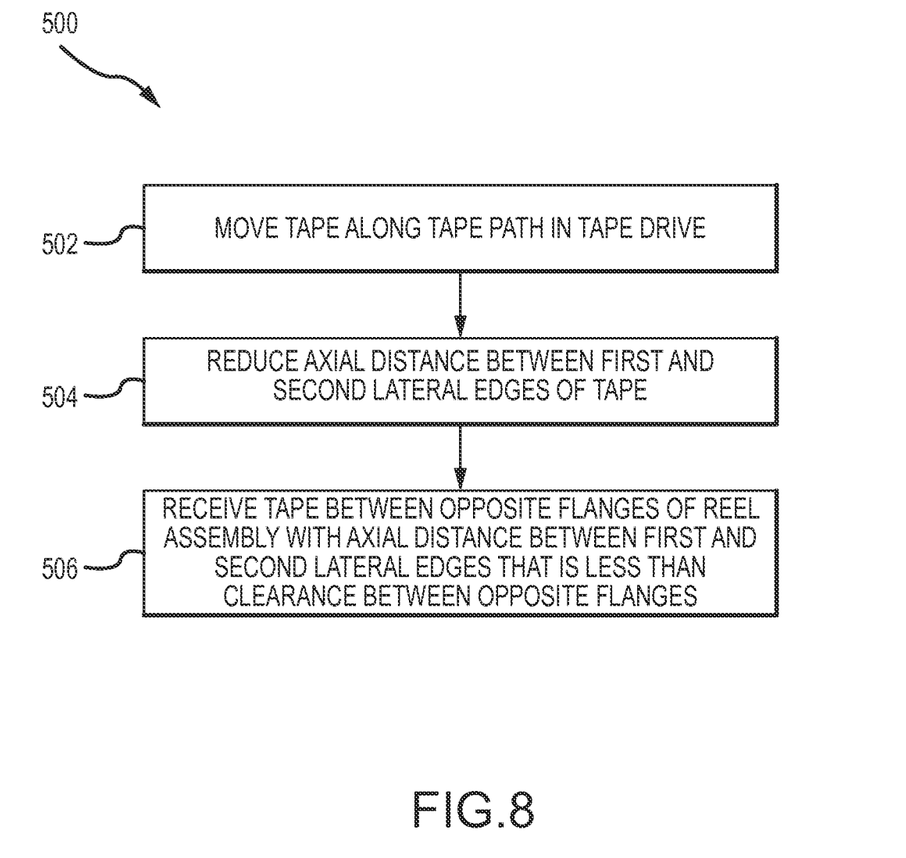
FIG. 8 is a flow diagram illustrating a method of reducing contact between opposite flanges of a reel and tape.

Now turning to FIG. 8, a method 500 for reducing contact between first and second opposite flanges of a reel assembly (e.g., reel assembly 120) and a tape (e.g., tape 116) being wound thereon or unwound therefrom is illustrated. A first step 502 includes moving tape 116 along a tape path (e.g., tape path 26) as the tape 116 approaches a reel assembly 120. For instance, the tape 116 may be moved along the tape path by the winding of the reel 120 via a motor (e.g. motor 32) or the like and eventually packed or wrapped around the reel hub 127 of the reel assembly 120. The method 500 also includes reducing 504 an axial distance between the first and second lateral edges 117, 118 of the tape 116. For instance, the axial distance between the first and second lateral edges 117, 118 may start out at a full width of the tape 116 and then reduce to a second axial distance less than the full width of the tape 116 after passing over or through a reducing device (e.g., reducing device 138, 138', 138", etc.).

Once the tape 116 has passed by the reducing device, the tape 116 may be received 506 between the first and second flanges 130, 132 of the reel assembly 120 with an axial distance between the first and second lateral edges 117, 118 that is less than the clearance 148 between the first and second flanges 130, 132 to create respective gaps 150, 154 between the tape 116 and the first and second flanges 130, 132 and thereby limit contact between the tape 116 and the first and second flanges 130, 132. As discussed previously, the tape 116 may gradually uncompress until the axial distance between the first and second lateral edges 117, 118 is the same as the width of the tape 116 at which point the tape may be received on the reel hub 127 or on the tape pack on the reel hub 1127. Despite the gradual uncompression or relaxation of the tape 116 between the reducing device and the reel hub 127 or tape pack as the tape 116 is being wound thereon, the gaps 150, 154 are still present to limit contact between the tape 116 and the first and second flanges 130, 132.

As the tape 116 is unwound from the reel hub 127 or tape pack, a reverse process may occur whereby the tape 116 may gradually compress (the axial distance between the first and second lateral edges 117, 118 may gradually decrease) so as to pull the first and second lateral edges 117, 118 away from the first and second flanges 130, 132 as the tape is moving in an opposite second direction along the tape path. After passing through or by the reducing device, the tape 116 may then gradually relax between the first and second lateral edges 117, 118 until the axial distance between the first and second lateral edges 117, 118 reaches the width of the tape 116.

It will be readily appreciated that many additions and/or deviations may be made from the specific embodiments disclosed in the specification without departing from the spirit and scope of the invention. For instance, the components and members of the various reducing devices disclosed herein may be constructed of one or more materials configured to limit friction between the reducing devices and the tape 116 passing thereby. As another example, while the disclosed reducing devices have been discussed primarily in the context of reel assemblies for tape drives, it is envisioned that the reducing devices may be used to reduce the width of the tape in other contexts such as web handling (e.g., paper, foil) and/or the like. Furthermore, while specific manners of limiting contact between a tape and flanges of a reel assembly have been discussed, others may be devised through the present teachings. The illustrations and discussion herein has only been provided to assist the reader in understanding the various aspects of the present disclosure. Furthermore, one or more various combinations of the above discussed arrangements and embodiments are also envisioned.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for a tape storage device, comprising:
   a reel including a hub for receiving tape thereon, a first flange member secured adjacent a first side of the hub, and a second flange member secured adjacent a second side of the hub, wherein the second side is opposite the first side; and
   a device positioned relative to the hub for reducing an axial distance between first and second lateral edges of the tape to limit contact between the tape and the first and second flange members, wherein the reel is moveable relative to the device.

2. The system of claim 1, wherein the device includes at least one member that is configured to contact one of the first and second lateral edges of the tape to reduce the axial distance between the first and second lateral edges of the tape.

3. The system of claim 2, wherein the at least one member includes at least first and second members that are respectively configured to contact the first and second lateral edges of the tape to reduce the axial distance between the first and second lateral edges of the tape, wherein a distance between the first and second members is less than a distance between opposite inner surfaces of the first and second flange members.

4. The system of claim 2, wherein the at least one member is rotatable about an axis to reduce friction between at least one member and the tape.

5. The system of claim 1, wherein the device has an opening through which the tape passes, wherein at least one inner cross-dimension of the opening is less than a distance between opposite inner surfaces of the first and second flange members.

6. The system of claim 1, wherein the device is not attached to the first or second flange members.

7. A tape drive, comprising:
   a housing; and
   the system of claim 1 disposed within the housing.

8. The tape drive of claim 7, wherein the device is secured to a portion of the housing.

9. The tape drive of claim 8, wherein the device is rotatably secured to the portion of the housing.

10. A tape drive, comprising:
    a housing;
    a reel secured within the housing; and
    a device positioned relative to the reel for reducing an axial distance between first and second lateral edges of tape before the tape is received on the reel, wherein the reel is moveable relative to the device.

11. The tape drive of claim 10, wherein the device includes an opening through which the tape is configured to pass along a tape path of the tape, wherein an inner cross-dimension of the opening is a first distance, and wherein a distance between first and second opposite flanges of the reel is a second distance greater than the first distance.

12. A method for reducing contact between tape and first and second spaced flanges of a reel in a tape drive, comprising the steps of:
    moving the tape along a tape path within the tape drive, wherein an axial distance between first and second lateral edges of the tape is a first axial distance during the moving step; and
    receiving the tape between the first and second spaced flanges of the reel, wherein the axial distance between first and second lateral edges of the tape is a second axial distance during at least a portion of the receiving step, and wherein the second axial distance is not greater than about 70% of the first axial distance.

13. The method of claim 12, further comprising before the receiving step:
    reducing the axial distance between the first and second lateral edges of the tape.

14. The method of claim 13, wherein the reducing step includes:
    directing the tape between first and second portions of a device, wherein a distance between the first and second portions is less than a distance between opposite inner surfaces of the first and second spaced flanges.

15. The method of claim 14, wherein the first and second portions are non-movably secured to the opposite inner surfaces of the first and second flange members.

16. The method of claim 14, wherein the first and second portions and the first and second flange members are movable relative to each other.

* * * * *

UNITED STATES PATENT AND TRADEMARK OFFICE
CERTIFICATE OF CORRECTION

| | | |
|---|---|---|
| PATENT NO. | : 9,007,715 B1 | |
| APPLICATION NO. | : 14/337304 | |
| DATED | : April 14, 2015 | |
| INVENTOR(S) | : Janssen et al. | |

It is certified that error appears in the above-identified patent and that said Letters Patent is hereby corrected as shown below:

IN THE SPECIFICATION

In column 1, line 67, delete "runout" and insert -- run out --, therefor.

Signed and Sealed this
Ninth Day of February, 2016

Michelle K. Lee
*Director of the United States Patent and Trademark Office*